United States Patent [19]

Williams

[11] Patent Number: 4,696,966

[45] Date of Patent: Sep. 29, 1987

[54] FLAME RETARDANT, IMPACT RESISTANT POLYAMIDE COMPOSITIONS

[75] Inventor: Ian G. Williams, Cleveland, England

[73] Assignee: Imperial Chemical Industries PLC, London, England

[21] Appl. No.: 858,043

[22] Filed: May 1, 1986

[30] Foreign Application Priority Data

May 14, 1985 [GB] United Kingdom ............... 8512119

[51] Int. Cl.$^4$ ........................... C08K 3/22; C08K 3/10
[52] U.S. Cl. .................... 524/412; 523/460; 524/288; 524/469; 524/471
[58] Field of Search ............... 525/182, 183; 523/460; 524/288, 469, 471, 412

[56] References Cited

U.S. PATENT DOCUMENTS

| | | | |
|---|---|---|---|
| 4,220,733 | 9/1980 | Jones | 525/183 |
| 4,301,058 | 11/1981 | Neukirchen et al. | 524/288 |
| 4,525,513 | 6/1985 | Hochberg et al. | 524/288 |
| 4,594,386 | 6/1986 | Olivier | 525/183 |
| 4,605,708 | 8/1986 | Yaacov et al. | 523/460 |

Primary Examiner—Veronica P. Hoke
Attorney, Agent, or Firm—Cushman, Darby & Cushman

[57] ABSTRACT

A fire retardant, impact resistant polyamide composition containing 1 to 25% of a rubbery copolymer containing functional groups derived from maleic, fumaric, norbornadiene and succinic anhydrides or an alicyclic carboxylic acid or functional derivative thereof having a cis-form double bond in the ring, 10 to 30% of a halogenated polymer having a weight average molecular weight greater than 5,000 and a synergist for the halogenated fire retardant. The composition provides a good level of impact strength in combination with a high level of fire retardancy. A particularly good balance of properties can be obtained from compositions containing fillers, especially glass fibres.

12 Claims, No Drawings

FLAME RETARDANT, IMPACT RESISTANT POLYAMIDE COMPOSITIONS

This invention relates to impact resistant, flame retardant polyamide compositions.

Many rubber additives have been proposed for addition to polyamides to produce a heterogeneous composition in which the matrix is the polyamide and finely dispersed particles of the rubbery additive provide a very substantial improvement in impact strength. Other additives, such as particulate or fibrous fillers may be included in such compositions whilst retaining a measure of improved impact strength. However a problem exists in that it is difficult to provide the aforementioned compositions with a high level of fire retardancy. The presence of the rubbery additive generally appears to increase the flammability of the compositions and the high levels of fire retardant necessary to overcome this increased burning tendency generally result in greatly reduced impact strength.

Compositions have now been found which provide a combination of high level of fire retardancy and impact strength.

According to the invention there is provided a polyamide composition comprising a. a synthetic, fibre forming polyamide comprising repeating carbonamide groups,
b. from 1 to 25% by weight of the total composition of a rubbery toughening additive copolymer having a glass transition temperature below 20° C., and preferably below 0° C., and which is formed from at least one ethylenically unsaturated monomer and a monomer providing functional groups selected from maleic, fumaric, norbornadiene and succinic anhydrides or an alicyclic carboxylic acid or functional derivative thereof having a cis-form double bond in the ring,
c. from 10 to 30% preferably 12 to 28% and desirably 15 to 25% by weight of the total composition of a fire retardant additive comprising a halogenated polymer having a weight average molecular weight in excess of 5,000
and
d. a synergist for the fire retardant additive the percentage weights of the components of the composition totally 100% by weight.

The specified combination of toughening agents and fire retardants provide the compositions of the invention with a high level of fire retardancy combined with a high level of impact strength. The level of properties achieved is superior to properties achieved with other combinations of fire retardants and toughening agents commonly used in polyamide compositions. Surprisingly, the compositions are tolerant to very high concentrations of rubbery additives without losing an acceptable level of fire retardancy and surprisingly high levels of toughness (impact strength) can be achieved using the rubbers of the invention.

The preferred polyamides used in the invention are polyamides having a melting point of at least 220° C. and containing a major proportion of repating units derived from hexamethylene adipamide, hexamethylene sebacamide or caprolactam. The most suitable polymers are homopolymers of nylon 66 and nylon 6 and copolymers of these materials containing not more than 50% by weight of units other than nylon 66 or nylon 6. These other units may be, for example, of nylon 6.9 or 6.10.

The preferred materials are the homopolymers of nylon 66 and nylon 6 and copolymers of nylon 66 with nylon 6.

The polyamides preferably have a number average molecular weight of at least 3000.

The rubbery toughening agents are preferably prepared by modification of an existing elastomeric polymer with a monomer providing the required functional group. Typically, the elastomeric polymer in molten form can be intimately mixed with the monomer under high shear conditions, optionally in the presence of a free radical generating agent to provide the functionally modified rubber. The melt mixing and shearing is conveniently performed in a screw extruder. The concentration of monomers carrying a functional group present in the eventual copolymers should preferably be within the range 0.05 to 5.0%, desirably between 0.1 and 2.5% by weight. Excellent results are obtained when the elastomer to be modified is a polymer of ethylene, and particularly when it is a copolymer of ethylene and propylene and, optionally, contains copolymerised diene monomers. Preferably the ethylene copolymer should contain at least 65% by weight of ethylene. Typical methods of extrusion grafting are described in British Pat. Nos. 1 436 981 and 1 512 137.

The fire retardant additive should be a halogenated polymer of weight average molecular weight exceeding 5,000 and preferably greater than 30,000. Several such additives are commercially available. A particularly effective additive in the context of this invention is poly(tribromostyrene) of molecular weight exceeding 30,000. Other suitable additives are brominated epoxy resins, brominated polyphenylene oxide and poly(penta chlorobenzyl acrylates providing they meet the molecular weight requirements.

The efficacy of halogen containing fire retardant additives is generally improved by the inclusion in the composition of synergists, particularly specific metal oxides. In the present invention antimony oxide, zinc oxide, iron oxides, and tin oxide may be employed with antimony oxide being preferred. (Ferrites, particularly zinc ferrite may also be used.) In general the proportion of fire retardant additive to synergist should be in the weight ratio 1:1 to 5:1, preferably 2:1 to 4:1.

The composition of the invention is particularly useful for providing impact resistance and flame retardancy to filled compositions and the concentration filler, when present, should be between 1 and 50% by weight of the total composition. Glass fibre is a preferred reinforcing filler for these polyamide compositions.

The compositions of the invention permit an excellent combination of toughness and fire retardancy to be obtained. In compositions containing at least 20% by weight of glass fibres, which have predominant importance in the applications for polyamide compositions, particularly good combinations of properties can be obtained. Thus compositions according to the invention may have a combination of a burning performance as judged by the Underwriters Laboratories Standard UL94 of V0, on a sample 1.6 mm thick, together with an impact strength as measured by the notched Izod method of ISO R180A of at least 70 J/m. It is possible to achieve improved toughness with some sacrifice of fire retardancy and other compositions glass reinforced according to the invention may have a UL94 rating of V1 (1.6 mm thick sample) in combination with a notched Izod value of at least 100 J/m.

A variety of other auxiliary additives, known in the art, may also be included in the compositions, such as heat and light stabilisers, pigments, nucleating agents and lubricants.

The invention is further illustrated by reference to the following examples.

EXAMPLE 1

The compositions detailed in Table 1 were prepared by compounding the listed ingredients in a 38 mm diameter vented, single screw extruder at a temperature of 280° C. to 300° C. All compositions contained nylon 66 as the polyamide of the composition and 6 mm chopped glass fibre as filler. The products were extruded as laces, cooled under water and chopped into granules. The dried granules were formed into test pieces for impact strength and burning performance determination.

| Composition | | | | | Properties | |
|---|---|---|---|---|---|---|
| Fire Retardant (% by wt) | Synergist (% by wt) | Filler (% by wt) | | Rubber | UL94 rating (on 1.6 mm thick) | Notched Izod (J/m) |
| 18 (68PB*) | 6 Sb$_2$O$_3$ | 25 | 5 | (MEP**) | V0 | 80.5 |
| 22.5 (68PB*) | 7.5 Sb$_2$O$_3$ | 24 | 5 | (MEP**) | V0 | 79.2 |
| 16.8 (68PB*) | 5.6 Sb$_2$O$_3$ | 23.3 | 2.5 | (MEP**) | V1 | 73.5 |
| 19 (68PB*) | 6.7 Sb$_2$O$_3$ | 23.8 | 9.8 | (MEP**) | V0 | 95 |
| 18 (68PB*) | 6.3 Sb$_2$O$_3$ | 22.5 | 14.5 | (MEP**) | V1 | 116 |
| 17 (68PB*) | 6.0 Sb$_2$O$_3$ | 21.3 | 19.3 | (MEP**) | V1 | — |
| 16 (68PB*) | 5.6 Sb$_2$O$_3$ | 20.0 | 24.0 | (MEP**) | V1 | 115 |
| 20 (68PB*) | 6.5 Sb$_2$O$_3$ | 27 | | NIL*** | V0 | 67 |

*Pyrochek 68PB having a molecular weight of about 100,000 obtained from Ferro Corporation.
**An ethylene/propylene rubber maleinised with maleic anhydride to have an incorporated maleic anhydride content of 1.5% by weight.
***Control run.

EXAMPLE 2

The procedure was repeated using two other polymeric halogenated fire retardants, a brominated epoxy resin and a brominated polyphenylene oxide having respectively molecular weights of about 40,000 and 6,000.

| Composition | | | | Properties | |
|---|---|---|---|---|---|
| Fire Retardant (% by wt) | Synergist (% by wt) | Glass Fibre (% by wt) | Rubber (% by wt) | UL94 rating | Notched Izod (J/m) |
| 20.8 F2400* | 6.9 Sb$_2$O$_3$ | 23 | 9.8 MEP | V0 | 70 |
| 18.6 F2400* | 6.2 Sb$_2$O$_3$ | 20.6 | 19.6 MEP | V1 | 104 |
| 18 PO64P** | 4.5 Sb$_2$O$_3$ | 20.6 | 10 MEP | V0 | 86 |
| 16 PO64P** | 4.0 Sb$_2$O$_3$ | 25.2 | 20 MEP | V1 | 160 |

*Mahkteshim F2400, a brominated epoxy resin supplied by Mahkteshim Chemical Co.
**Firemaster PO64P, a brominated polyphenylene oxide supplied by Great Lakes Corporation.

COMPARATIVE EXAMPLE A

The procedure of Example 1 was used to evaluate a non-polymeric fire retardant commonly used in polyamide compositions.

| Composition | | | | Properties |
|---|---|---|---|---|
| Fire Retardant (% by wt) | Synergist (% by wt) | Glass Fibre % by wt | Rubber % by wt | UL94 rating |
| 16.2 Dec 515* | 5.4 Sb$_2$O$_3$ | 24.3 | 10 MEP | HB |
| 14.4 Dec 515 | 4.8 Sb$_2$O$_3$ | 21.6 | 20 MEP | HB |

*Dechlorane 515 supplied by Hooker Chemical Corporation.

COMPARATIVE EXAMPLE B

The procedure of Example 1 was repeated using a rubber not having the prescribed functional groups.

| Composition | | | | Properties | |
|---|---|---|---|---|---|
| Fire Retardant (% by wt) | Synergist (% by wt) | Glass Fibre (% by wt) | Rubber (% by wt) | UL94 Rating | Notched Izod (J/m) |
| 20 F2400 | 6.75 Sb$_2$O$_3$ | 22.5 | 10 Surlyn 1706* | V0 | 53.7 |
| 16.2 Dec 515 | 5.4 Sb$_2$O$_3$ | 24.3 | 10 Surlyn 1706* | HB | 62.0 |
| 20 F2400 | 7 Sb$_2$O$_3$ | 25.0 | 0** | V0 | 49.2 |

*Surlyn 1706 is an ethylene/methacrylic acid copolymer partially neutralised with a zinc salt obtained from Du Pont.
**Control.

EXAMPLE 3

These compositions demonstrate the use of the invention in mineral filled compositions.

| Composition | | | | Properties | |
|---|---|---|---|---|---|
| Fire Retardant (% by wt) | Synergist (% by wt) | Filler (% by wt) | Rubber (% by wt) | UL94 Rating | Impact Strength Unnotched Charpy kJ/m$^{-2}$ |
| 20 | F2400 6.0 | 30 Clay | 5 MEP | V0 | 21 |
| 17.5 | F2400 6.0 | 30 Clay | NIL* | V0 | 14 |
| 15 | F2400 5.0 | 30 Talc | 5 MEP | V0 | 18 |
| 15 | F2400 5.0 | 30 Talc | NIL* | V0 | 15 |

*Controls.

I claim:

1. A polyamide composition comprising:
   a. a synthetic, fibre forming polyamide comprising repeating carbonamide groups,
   b. from 1 to 25% by weight of the total composition of a rubbery toughening additive copolymer having a glass transition temperature below 20° C., and which is formed from at least one ethylenically unsaturated monomer and a monomer providing functional groups selected from maleic, fumaric, norbornadiene and succinic anhydrides or an alicyclic carboxylic acid or functional derivative thereof having a cis-form double bond in the ring,
   c. from 10 to 30% by weight of the total composition of a fire retardant additivie comprising a halogenated polymer having a weight average molecular weight in excess of 5,000, wherein the halogenated polymer is selected from the group consisting of poly(tribromostyrene), brominated epoxy resins, brominated polyphenylene oxide and poly(penta halobenzyl acrylate), and
   d. a synergist for the fire retardant additive, the percentage weights of the components of the composition totaling 100% by weight.

2. A polyamide composition according to claim 1 wherein the concentration of halogenated polymer having a molecular weight in excess of 5,000 is from 12 to 28%.

3. A polyamide composition according to either of claims 1 or 2 in which the weight average molecular weight of the halogenated polymer is in excess of 30,000.

4. A polyamide composition according to any one of claims 1 or 2 in which the concentration of monomers carrying a functional group from which rubbery toughening additive copolymer is formed is within the range 0.05 to 5% by weight.

5. A polyamide composition according to claim 4 in which the rubbery copolymer is an ethylene copolymer containing at least 65% by weight of ethylene.

6. A polyamide composition according to claim 5 in which the ethylene copolymer is a copolymer formed from monomers including ethylene and propylene.

7. A polyamide composition according to any one of claims 1 or 2 in which the synergist is selected from antimony oxide, zinc oxide, iron oxide, tin oxides and zinc ferrite.

8. A polyamide composition according to claim 7 in which the weight ratio of halogenated polymer to synergist is in the weight ratio between 1:1 and 5:1.

9. A polyamide composition according to any one of claims 1 or 2 in which the composition contains from 1 to 50% by weight of the composition of filler.

10. A polyamide composition according to claim 9 in which the filler is glass fibres.

11. A polyamide composition according to claim 10 containing at least 20% by weight of glass fibres and having a burning performance rated as V0 on a sample 1.6 mm thick according to Underwriters Laboratories Standard UL94 together with an impact strength as measured by the notched Izod method of ISO R180A of at least 70 J/m.

12. A polyamide composition according to claim 10 containing at least 20% by weight of glass fibres and having a burning performance rated as V1 on a sample 1.6 mm thick according to Underwriters Laboratories Standard UL94 together with an impact strength as measured by the notched Izod method of ISO R180A of at least 100 J/m.

* * * * *